(12) United States Patent
Griffin et al.

(10) Patent No.: US 12,126,717 B1
(45) Date of Patent: *Oct. 22, 2024

(54) DERIVED UNIQUE RANDOM KEY PER TRANSACTION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/562,699

(22) Filed: Dec. 27, 2021

Related U.S. Application Data (63) Continuation of application No. 16/287,743, filed on Feb. 27, 2019, now Pat. No. 11,212,090.

(51) Int. Cl.
*H04L 9/08* (2006.01)
*H04L 9/16* (2006.01)
*H04L 9/40* (2022.01)

(52) U.S. Cl.
CPC .......... *H04L 9/0869* (2013.01); *H04L 9/0866* (2013.01); *H04L 9/16* (2013.01); *H04L 63/0435* (2013.01)

(58) Field of Classification Search
CPC ....... H04L 9/0869; H04L 9/0866; H04L 9/16; H04L 63/0435
See application file for complete search history.

(56) References Cited

U.S. PATENT DOCUMENTS

| | | | | |
|---|---|---|---|---|
| 6,128,391 A | * | 10/2000 | Denno | H04L 9/3271 713/169 |
| 7,319,987 B1 | * | 1/2008 | Hoffman | G06Q 40/02 705/44 |
| 7,353,388 B1 | * | 4/2008 | Gilman | H04L 9/3273 713/168 |
| 7,526,652 B2 | | 4/2009 | Ziegler | |
| 7,548,621 B1 | * | 6/2009 | Smith | H04L 9/0625 713/194 |
| 8,737,623 B2 | | 5/2014 | Hart | |
| 9,106,633 B2 | | 8/2015 | Carnes | |
| 9,191,208 B2 | | 11/2015 | Yagisawa | |
| 9,461,973 B2 | | 10/2016 | Barnett et al. | |

(Continued)

OTHER PUBLICATIONS

Herrero-Collantes, Miguel, and Juan Carlos Garcia-Escartin. "Quantum random number generators." Reviews of Modern Physics 89.1 (2017): 015004. (Year: 2017).*

(Continued)

*Primary Examiner* — Techane Gergiso
(74) *Attorney, Agent, or Firm* — Foley & Lardner LLP (57) ABSTRACT

In one arrangement, a method for using symmetric keys between two entities comprising a device and a host include initiating, by the device, a transaction involving original data, wherein the original data needs to be verified by the host. The method further includes deriving, by the device, a first key based on a previously generated key and a first number, wherein the first key is unique to the transaction, and the first number is randomly generated. The method further includes sending, by the device, the first key to the host for verification.

20 Claims, 5 Drawing Sheets

(56) References Cited

U.S. PATENT DOCUMENTS

| | | | |
|---|---|---|---|
| 10,326,803 B1* | 6/2019 | Haney | H04L 63/30 |
| 10,581,611 B1* | 3/2020 | Osborn | H04B 5/0056 |
| 10,679,212 B2* | 6/2020 | Hayhow | G06Q 20/3829 |
| 11,050,555 B2* | 6/2021 | Liu | H04L 9/0861 |
| 2002/0198848 A1 | 12/2002 | Michener | |
| 2003/0188158 A1* | 10/2003 | Kocher | G06Q 20/40975 |
| | | | 713/161 |
| 2004/0044739 A1* | 3/2004 | Ziegler | G07F 7/0826 |
| | | | 709/213 |
| 2008/0040285 A1 | 2/2008 | Wankmueller | |
| 2008/0189214 A1* | 8/2008 | Mueller | G06Q 20/20 |
| | | | 705/72 |
| 2008/0208758 A1* | 8/2008 | Spiker | G07F 7/1016 |
| | | | 705/73 |
| 2010/0125509 A1 | 5/2010 | Kranzley et al. | |
| 2011/0307710 A1* | 12/2011 | McGuire | G06Q 20/12 |
| | | | 726/9 |
| 2012/0191615 A1 | 7/2012 | Schibuk | |
| 2013/0168450 A1* | 7/2013 | von Mueller | H04L 9/0618 |
| | | | 235/449 |
| 2013/0198519 A1 | 8/2013 | Marien | |
| 2013/0254117 A1 | 9/2013 | Von Mueller et al. | |
| 2014/0108172 A1* | 4/2014 | Weber | G06Q 30/00 |
| | | | 705/17 |
| 2014/0164254 A1* | 6/2014 | Dimmick | G06Q 20/4012 |
| | | | 705/44 |
| 2014/0258132 A1 | 9/2014 | Swamy et al. | |
| 2015/0019442 A1 | 1/2015 | Hird et al. | |
| 2015/0046340 A1 | 2/2015 | Dimmick | |
| 2015/0142665 A1 | 5/2015 | Dicker et al. | |
| 2015/0142670 A1* | 5/2015 | Zloth | G06Q 20/3829 |
| | | | 705/71 |
| 2015/0199682 A1* | 7/2015 | Kalgi | G06Q 20/32 |
| | | | 705/64 |
| 2015/0270961 A1 | 9/2015 | Barnett et al. | |
| 2015/0332283 A1 | 11/2015 | Witchey | |
| 2015/0339664 A1 | 11/2015 | Wong et al. | |
| 2016/0020906 A1 | 1/2016 | Nolte et al. | |
| 2016/0027017 A1 | 1/2016 | Chitragar | |
| 2016/0063781 A1 | 3/2016 | Whytock et al. | |
| 2016/0125376 A1 | 5/2016 | Beatty et al. | |
| 2016/0189136 A1 | 6/2016 | Mercille | |
| 2016/0203496 A1 | 7/2016 | Guerrero et al. | |
| 2016/0330027 A1 | 11/2016 | Ebrahimi | |
| 2017/0147975 A1 | 5/2017 | Natarajan et al. | |
| 2019/0188703 A1* | 6/2019 | Murray | G06Q 20/389 |
| 2019/0243961 A1* | 8/2019 | Ollivier | G06F 21/44 |
| 2019/0312720 A1* | 10/2019 | Liu | H04L 9/083 |

OTHER PUBLICATIONS

Brier et al., "A Forward-Secure Symmetric-Key Derivation Protocol How to Improve Classical DUKPT", ASIACRYTP 2010, LNCS 6477, pp. 250-267.

MagTek Mobile Payment Devices are Now iPhone 7 Ready, PRWeb ebooks, Seal Beach, CA; Sep. 12, 2016. http://www.prweb.com/releases/2016/09/prweb13676398.htm; 2 pages.

Saha et al., "Applicability of DUKPT Key Management Scheme to Cloud Wallet and other Mobile Payments", International Journal of Computer Applications, Dec. 2014, 6 pages.

Sitek, Albert; "One-Time Code Cardholder Verification Method in Electronic Funds Transfer Transactions", Annales UMCS Informatica AI XIV, 2 (2014), pp. 46-59.

* cited by examiner

DERIVED UNIQUE RANDOM KEY PER TRANSACTION

CROSS-REFERENCE TO RELATED APPLICATIONS

This application is a continuation of and claims priority to U.S. patent application Ser. No. 16/287,743, entitled "DERIVED UNIQUE RANDOM KEY PER TRANSACTION," filed Feb. 27, 2019, the contents of which is incorporated by reference herein in its entirety and for all purposes.

BACKGROUND

The existing Derive Unique Key Per Transaction (DUKPT), defined in the American National Standards Institute (ANSI) standard X9.24-3 provides a method to enable a transaction processing service (TPS) to receive cryptographically protected personal identification numbers (PIN) from numerous terminals using a unique symmetric cryptographic key per transaction in an asynchronous manner but only managing one base key. DUKPT accomplishes this by using a transaction counter with a maximum limit and various one-way functions to derive keys, which are used to encrypt a PIN at the point of entry. The encrypted data, the transaction counter, and the terminal identifier (TID) are sent to the host system. The host is able to re-derive the terminal initial key and then re-derive the cryptographic key using the transaction counter and the initial key. Once the initial key has been injected into the terminal and the terminal has been deployed, initial key replacement is problematic. Older terminals were decommissioned when the transaction counter maximized, or replacement initial keys might be loaded using manual procedures or newer methods including asymmetric (public key cryptography) key exchange.

SUMMARY

In one arrangement, a method for using symmetric keys between two entities comprising a device and a host includes initiating, by the device, a transaction involving a first original data, wherein the first original data needs to protected. The method further includes deriving, by the device, a first cryptographic key based on an initial key and a first number, wherein the first cryptographic key is unique to the transaction, and the first number is randomly generated. The method further includes encrypting, by the device, the first original data with the first cryptographic key. The device generates a first parameter based on the first number and sends the protected first original data and the first parameter to the host.

In another arrangement a client device comprises a network interface and a processing circuit. The processing circuit is configured to initiate, by the client device, a transaction involving a first original data, wherein the first original data needs to be protected. The processing circuit is further configured to derive, by the device, a first cryptographic key based on an initial key and a first number, wherein the first cryptographic key is unique to the transaction, and the first number is randomly generated. The processing circuit is further configured to protect, by the device, the first original data with the first cryptographic key. The processor is also configured to generate, by the device, a first parameter based on the first number and send, by the device, the first cryptographic key and the first parameter to a host.

In a further arrangement, a method for using symmetric keys between a device and a host includes receiving, by the host, a first parameter, an initial key, and a protected first original data from the device, wherein the first parameter is unique to a transaction. The method further includes deriving, by the host, a first host-derived cryptographic key based on the first parameter and the initial key. The method also includes decrypting and verifying, by the host, the protected first original data based on the first host-derived cryptographic key.

In another arrangement, a host comprises a network interface and a processing circuit configured to receive a first parameter, an initial key, and a protected first original data from a device, wherein the first parameter is unique to a transaction. The processing circuit is further configured to derive a host-derived cryptographic key based on the first parameter and the initial key. The processing circuit is also configured to decrypt and verify, by the host, the protected first original data based on the first host-derived cryptographic key.

These and other features, together with the organization and manner of operation thereof, will become apparent from the following detailed description when taken in conjunction with the accompanying drawings.

DETAILED DESCRIPTION

Referring generally to the FIGS., apparatuses, systems, methods, and non-transitory computer-readable media described herein relate to deriving and generating a Derived Unique Random Key Per Transaction (DURKPT). In some arrangements, a key generated using a DURKPT method is used once per transaction and is unique to that transaction. The same original data encrypted with a different key will yield a different cryptogram.

The original data can be communicated between a device and a host, with the key derived using the DURKPT method used to encrypt and decrypt the original data. In some arrangements, the host stores only the base key from which other keys are derived, while other derived keys can be deleted after being used.

Arrangements described herein enable a device (e.g., a transaction origination service) to receive cryptographically protected data (e.g., encryption, MAC, HMAC, etc.) from numerous terminals using a unique symmetric cryptographic key per device and per transaction. Furthermore, each terminal only contains symmetric keys that have not yet been used such that the physical compromise of one terminal does not affect other terminals, the device, or previous transactions from the compromised terminal. Arrangements described herein do not employ asymmetric cryptography, therefore the methods described herein are post quantum cryptography (PQC) ready. Arrangements described herein employs a random number generator (RNG) and straightforward modular arithmetic to derive an unlimited number of random keys chosen from a very large key space like an Advanced Encryption Standard (AES) 256-bit space. Though it is possible that the same key may be chosen more than once, using a RNG makes this occurrence unpredictable and undetectable. Arrangements described herein also support any symmetric algorithm (e.g., the AES algorithm). Additionally, the arrangements described herein do not require rekeying or decommissioning because new, random keys are continuously generated. Arrangements described herein provide for generation of unpredictable keys, thus providing more security than a traditional DUKPT model. Accordingly, the arrangements described herein provide for more secure key generation than traditional DUKPT models by incorporating randomly generated numbers in the key generation process.

A symmetric key refers to a cryptographic key that is identical for the sender and receiver of a data transmission. Both the sender and receiver must have the same key (e.g., the symmetric key) for the data to be transmitted to the receiver such that the receiver can either decipher the encrypted data or verify an Integrity Check Value (ICV) based on a hash-based message authentication code (HMAC) or a message authentication code (MAC).

Figure 1:
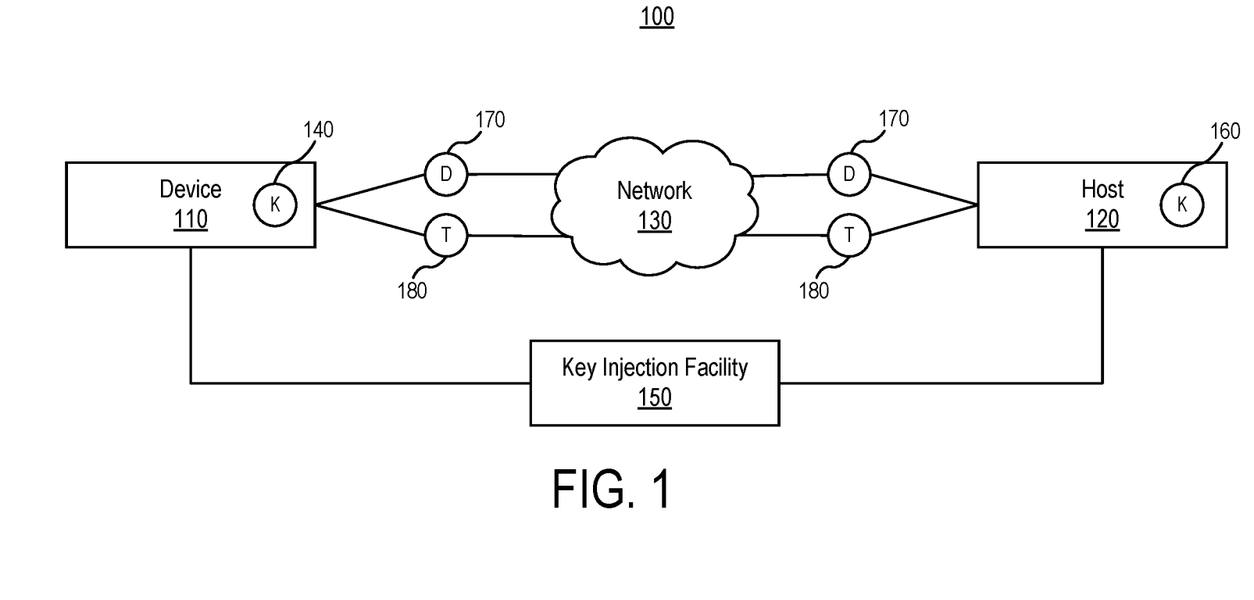
FIG. 1 is a block diagram of a system for generating cryptographic keys between a device and a host, according to some arrangements.

FIG. 1 is a block diagram of a system 100 for generating cryptographic keys between a device and a host, according to some arrangements. The system 100 includes at least a device 110, a host 120, and a key injection facility 150. Each of the device 110, the host 120, and the key injection facility 150 is a computing system having processing, storage, and networking capabilities for generating, communicating, and or verifying keys (e.g., a key 140). In some arrangements, the device 110 can be a terminal (e.g., a payment processor, a bank, etc.). In other arrangements, the device 110 can be an Internet connected computing device (e.g., a computer, smartphone, etc.). In yet other arrangements, the device 110 can be any Internet of Things (IoT) connected device (e.g., a digital assistant, a thermostat, a vehicle, etc.). In some arrangements, the host 120 can be a TPS (e.g., a payment processing system, etc.). In other arrangements, the host 120 can be any Internet connected device that has a network address (e.g., a computer, smartphone, etc.). In particular, the device 110 can derive the key 140 and send encrypted original data 170 and a parameter 180 to the host 120 via the network 130. The key 140 is a DURKPT in the manner described with reference to FIG. 3. The key 140 is a symmetric key and can be derived from an initial key and a random number. The key 140 and is used to protect the encrypted original data 170 communicated between the device 110 and the host 120.

The original data can be any type of information. Examples of original data include, but are not limited to, a payment card number (e.g., a credit card number, a debit card number, and the like), a financial account number, a password, social security number, a name, an address, an email address, or any Personally Identifiable Information (PII). In some examples, the original data can be a security object (e.g., a token, a certificate, and the like). In some examples, the original data can be a seed for key-generation (e.g., for generating a One-Time-Password (OTP)). The examples of the original data presented herein are not intended to be an exhaustive list of all possible implementations. The original data refers to any information that needs protection during transmission and storage.

The device 110 is a device that can initiate transactions for which keys (e.g., the key 140) need to be generated to protect the original data associated with those transactions. Examples of the device 110 include, but are not limited to, a mobile device, a smartphone, a laptop computer, a tablet, a desktop computer, a point-of-sale (POS) device, an Automatic Teller Machine (ATM), and the like. In some arrangements, the same original data (e.g., a payment number, PIN, etc.) can be associated with multiple transactions. Illustrating with a non-limiting example, payment transactions in different instances using the same payment card number can be initiated via the device 110. Other types of transactions (such as, but not limited to, exchange security objects) can be likewise implemented. A user (e.g., a customer, a merchant, and the like) can initiate the transaction by providing corresponding user input. In some arrangements, the device 110 does not store the original data or used keys. The device 110 can derive the keys (e.g., the key 140) on an ad hoc basis, responsive to each transaction. In some arrangements, the device 110 stores a local copy of the original data.

The host 120 is a computing system that can receive the encrypted original data 170 and the parameter 180 from the device 110 and derive a key 160. The key 160 allows the host 120 to decrypt the encrypted original data 170. In some arrangements, the host 120 stores the original data from which the key 140 is derived. In some arrangements, the host 120 does not store any keys aside from a base key from which other keys can be derived. The host 120 can derive the keys (e.g., the key 160) on an ad hoc basis, responsive to each transaction. In other words, the host 120 can function as a TPS without any key storage. Illustrating with a non-limiting example, the host 120 can be a computing system of a financial institution that issues a bank card (e.g., a credit card, a debit card, and the like) to the user of the device 110. The host 120 can authenticate or approve transactions initiated by the user by verifying the original data (e.g., the encrypted original data 170) corresponding to those respective transactions.

The key injection facility 150 is a computing system that can use a unique identifier for the device 110 (e.g., a serial number, etc.) as input to a function, and derive an initial key that is loaded into the device 110 and the host 120. The initial key is used as the basis for generating future keys (e.g., the key 140 and the key 160) according to the DURKPT schema.

The network 130 is any suitable Local Area Network (LAN), Wide Area Network (WAN), or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 130 is structured to permit the exchange of data, values, instructions, messages, and the like.

Figure 2A:
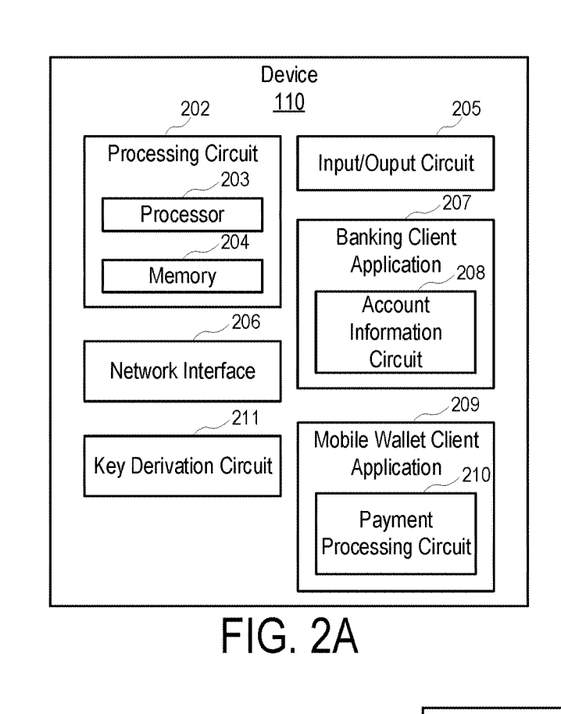
FIG. 2A is a block diagram of an example of the device of the system set forth in FIG. 1, according to some arrangements.

FIG. 2A is a block diagram of an example of the device 110 of the system 100 set forth in FIG. 1, according to some arrangements. Referring to FIGS. 1-2A, the device 110 is shown to include various circuits and logic for implementing the operations described herein. More particularly, the device 110 includes one or more of a processing circuit 202, an input/output circuit 205, a network interface 206, a banking client application 207, a mobile wallet client application 209, and a key derivation circuit 211. While various circuits, interfaces, and logic with particular functionality are shown, it should be understood that the device 110 includes any number of circuits, interfaces, and logic for facilitating the operations described herein. For example, the activities of multiple circuits are combined as a single circuit and implemented on a same processing circuit (e.g., the processing circuit 202), as additional circuits with additional functionality are included.

In some arrangements, the device 110 includes a processing circuit 202 having a processor 203 and memory 204. The processor 203 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 204 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein. In some arrangements, the memory 204 stores various security keys, such as, but not limited to, the key 140.

The input/output circuit 205 is configured to receive user input from and provide information to the user. In this regard, the input/output circuit 205 is structured to exchange data, communications, instructions, etc. with an input/output component of the device 110. Accordingly, in some arrangements, the input/output circuit 205 includes an input/output device such as a display device, touchscreen, keyboard, microphone, and/or the like. In arrangements in which the device 110 is a POS device or an ATM, the input/output circuit 205 can include one or more of a payment card reader, a barcode reader, a Bluetooth device, a Near Field Communication (NFC) reader, and the like for receiving information from a customer. In some arrangements, the input/output circuit 205 includes communication circuitry for facilitating the exchange of data, values, messages, and the like between the input/output device and the components of the device 110. In some arrangements, the input/output circuit 205 includes machine-readable media for facilitating the exchange of information between the input/output device and the components of the device 110. In still another arrangement, the input/output circuit 205 includes any combination of hardware components (e.g., a touchscreen), communication circuitry, and machine-readable media.

The network interface 206 is configured for and structured to establish connection with the server 120. The network interface 206 is structured for sending and receiving of data over a communication network (e.g., the P2P network). Accordingly, the network interface 206 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

One or more of the banking client application 207 and the mobile wallet client application 209 are server-based applications executable on the device 110. In this regard, the user of the device 110 has to first download the application(s) prior to usage. In another arrangement, the banking client application 207 and/or mobile wallet client application 209 are coded into the memory 204 of the device 110. In still another arrangement, the banking client application 207 and/or mobile wallet client application 209 are web-based interface applications. In this configuration, the user has to log onto or otherwise access the web-based interface before usage. In this regard, at least one of the banking client application 207 and mobile wallet client application 209 is supported by a separate computing system comprising one or more servers, processors, network interface modules, etc. that transmit the applications for use to the device 110. In certain arrangements, one or more of the banking client application 207 and/or mobile wallet client application 209 include an Application Protocol Interface (API) and/or a Software Development Kit (SDK) that facilitate integration of other applications. All such variations and combinations are intended to fall within the spirit and scope of the present disclosure.

The banking client application 207 is communicably coupled to the host 120 (e.g., an account database 228 of FIG. 2B) and is structured to permit management of at least one account of the user via the banking client application 207. In this regard, the banking client application 207 provides displays indicative of account information, such as, but not limited to, current account balances, pending transactions, profile information (e.g., contact information), rewards associated with the account, bill pay information, and/or the like. Further, in some arrangements, the banking client application 207 is configured to process payments from the user to a designated recipient. In some examples, a bill pay option is provided by the banking client application 207, where the bill pay option allows the user to pay his/her bills in response to user input. Accordingly, the banking client application 207 can be used to initiate transactions.

As mentioned herein, the user pays bills (e.g., mortgage, etc.), views balances, pays merchants, and otherwise manages their account via the banking client application 207. Accordingly, and as shown, the mobile bank client application 207 includes an account information circuit 208. The account information circuit 208 is linked or otherwise coupled to one or more accounts held by the user and permits management of the associated accounts (e.g., transfer balances between accounts, view payment history, etc.) by communicating with the host 120. The banking client application 207 is communicably coupled to the mobile wallet client application 209. As such, in response to a mobile payment via the mobile wallet client application 209, the mobile wallet client application 209 causes the banking client application 207 to update the payment account (i.e., the account that supported the mobile payment). As such, the applications 207 and 209 are communicably coupled to each other to enable actions supported by each respective application.

The mobile wallet client application 209 is communicably coupled to the host 120 (e.g., a mobile wallet database 229) and is structured to facilitate purchases by the user via the mobile wallet client application 209. Accordingly, the mobile wallet client application 209 is linked or otherwise connected with one or more accounts of the user. In the arrangements in which the device 110 is a customer's mobile device, when at a POS terminal, the user initiates the mobile wallet client application 209 and provides a passcode (e.g., biometrics such as a thumbprint, a Personal Identification Number (PIN), a password, etc.) to authenticate the user and select the source payment account desired (e.g., a checking account from a particular financial institution that is linked to the mobile wallet client application 209). Via communication with the payment terminal (e.g., via near field communication), the aforementioned payment information is provided to the POS terminal or the merchant (e.g., via NFC, via barcode presentment, etc.), and the payment is processed. Beneficially, carrying payment cards is avoided or reduced via the mobile wallet client application 209. Accordingly, the mobile wallet client application 209 can be used to initiate transactions.

As mentioned herein, the mobile wallet client application 209 is structured to facilitate and permit payments by interfacing with a user's account managed by the host 120. Accordingly, the mobile wallet client application 209 is communicably coupled via the network interface 206 over the network 130 to the host 120. As shown, the mobile wallet client application 209 includes a payment processing circuit 210 structured to facilitate payments by the user via the mobile wallet client application 209. For example, the payment processing circuit 210 enables a quick-pay capability with a merchant. In this regard, the payment processing circuit 210 includes or is communicably coupled with a communication device (e.g., a near-field communication chip) that facilitates the exchange of information between the mobile wallet client application 209 and a POS terminal.

The key derivation circuit 211 is executed by the processing circuit 202 in some arrangements. The key derivation circuit 211 can derive keys (e.g., the key 140) based on an initial key and a random number in the manner described. The device 110 can provide the key derivation circuit 211 in various manners. In some arrangements, the key derivation circuit 211 is a server-based application executable on the device 110. In this regard, the user of the device 110 has to download the key derivation circuit 211 from the host 120 or another application download server prior to usage. In some arrangements, the key derivation circuit 211 is a web-based interface application provided by the host 120. In this configuration, the user has to log onto or otherwise access the web-based interface before usage. In this regard, the host 120 transmits the key derivation circuit 211 to the device 110. In some arrangements, the key derivation circuit 211 includes an API and/or an SDK provided by the host 120 that facilitates integration with other applications. In other arrangements, the key derivation circuit 211 is coded into the memory 204 of the device 110. All such variations and combinations are intended to fall within the spirit and scope of the present disclosure.

The key derivation circuit 211 is operatively coupled to one or more of the components of the device 110. For example, the key derivation circuit 211 is operatively coupled to the network interface 206 for communicating with the server 120. The key derivation circuit 211, as facilitated by the network interface 206, can send original data and a parameter, such as, but not limited to, the encrypted original data 170 and the parameter 180, to the host 120. In some examples, the key derivation circuit 211 is coupled to the input/output circuit 205 to display output and receive user input.

Figure 2B:
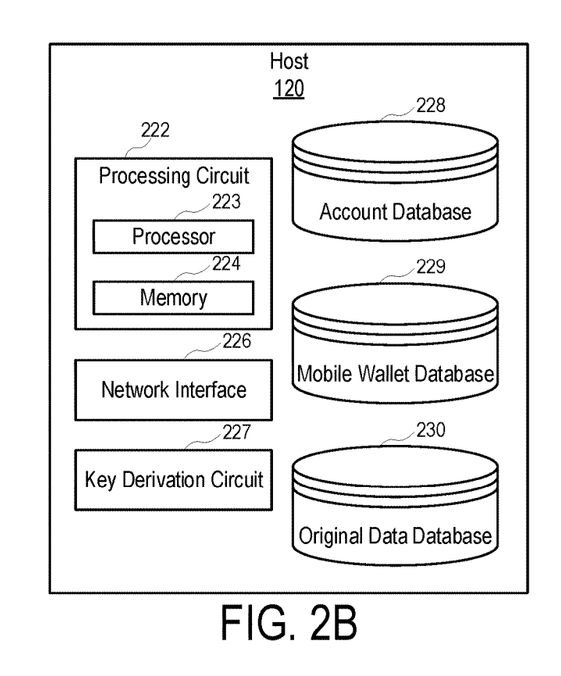
FIG. 2B is a block diagram of an example of the host of the system set forth in FIG. 1, according to some arrangements.

FIG. 2B is a block diagram of an example of the host 120 of the system 100 set forth in FIG. 1, according to some arrangements. Referring to FIGS. 1-2B, the host 120 is shown to include various circuits and logic for implementing the operations described herein. More particularly, the host 120 includes one or more of a processing circuit 222, a network interface 226, a key derivation circuit 227, an account database 228, a mobile wallet database 229, and an original data database 230. While various circuits, interfaces, and logic with particular functionality are shown, it should be understood that the host 120 includes any number of circuits, interfaces, and logic for facilitating the operations described herein. For example, the activities of multiple circuits are combined as a single circuit and implemented on a same processing circuit (e.g., the processing circuit 222), as additional circuits with additional functionality are included. In some arrangements, the processing circuit 222 has a processor 223 and memory 224.

The processor 223 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 224 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 224 is or includes tangible, non-transient volatile memory or non-volatile memory. Accordingly, the memory 224 includes database components, object code components, script components, or any other type of information structure for supporting the various activities and information structures described herein. In some arrangements, the memory 224 stores various security keys, such as, but not limited to, the key 140.

The network interface 226 is configured for and structured to establish connection with the device 110. The network interface 226 is structured for sending and receiving of data over a communication network (e.g., the P2P network). Accordingly, the network interface 226 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The key derivation circuit 227 can be implemented with the processing circuit 222 or a separate processing circuit such as, but not limited to, the processing circuit 222. In some arrangements, the key derivation circuit 227 can derive keys based on an initial key and a parameter in the manner described. In some arrangements, the key derivation circuit 227 provides key generation functionalities to the host 120. Illustrating with a non-limiting example, the key derivation circuit 227 provides a host-based application to be downloaded by the host 120. Illustrating with another non-limiting example, the key derivation circuit 227 provides a web-based application to be accessed by the host 120. The key derivation circuit 227 can provide APIs and/or SDKs to the host 120.

The key derivation circuit 227 is operatively coupled to one or more of the components of the server 120. For example, the key derivation circuit 227 is operatively coupled to the network interface 226 for communicating with the device 110. The key derivation circuit 227 as facilitated by the network interface 226 can receive encrypted original data and a parameter (e.g., the encrypted original data 170 and the parameter 180) from the device 110.

The account database 228 that stores customer information and account information relating to one or more accounts held by the user or customer of the device 110 with the server 120. In this regard, more than one financial institution with an associated financial institution computing system can be communicably coupled to the components of FIG. 2B over the network 130 to access the accounts held by the user or customer. The account database 228 stores transaction history of transactions using one or more accounts with, for example, the banking client application 270, the mobile wallet client application 280, or with other suitable applications.

The mobile wallet account database 229 stores mobile wallet accounts of users, including the user or customer of the client device 110. The mobile wallet accounts permit payments via a mobile wallet client application 209 of the client device 110. The mobile wallet account database 229 stores transaction history of transactions made by the user or customer using the mobile wallet client application 209.

The original data database 230 stores the original data. In some arrangements, the original data database 230 stores relationships (e.g., in a lookup table) between the original data and unique identification. The unique identification can be used to identify corresponding original data.

Figure 2C:
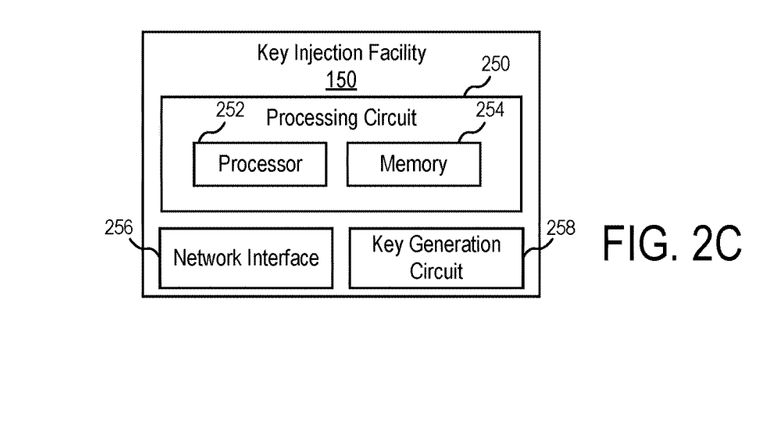
FIG. 2C is a block diagram of an example of the key injection system set forth in FIG. 1, according to some arrangements.

FIG. 2C is a block diagram of an example of the key injection facility 150 set forth in system 100 of FIG. 1, according to some arrangements. Referring to FIGS. 1-2C, the key injection facility 150 is shown to include various circuits and logic for implementing operations described herein. More particularly, the key injection facility 150 includes one or more of a processing circuit 250, a network interface 256, and a key generation circuit 258. While various circuits, interfaces, and logic with particular functionality are shown, it should be understood that the key injection facility 150 includes any number of circuits, interfaces, and logic for facilitating the operations described herein. For example, the activities of multiple circuits are combined as a single circuit and implemented on a same processing circuit (e.g., the processing circuit 250), as additional circuits with additional functionality are included. In some arrangements, the processing circuit 250 has a processor 252 and memory 254.

The processor 252 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 254 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 254 is or includes tangible, non-transient volatile memory or non-volatile memory. Accordingly, the memory 254 includes database components, object code components, script components, or any other type of information structure for supporting the various activities and information structures described herein.

The network interface 256 is configured for and structured to establish connection with the device 110. The network interface 256 is structured for sending and receiving of data over a communication network (e.g., the P2P network). Accordingly, the network interface 256 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The key generation circuit 258 is executed by the processing circuit 250 in some arrangements. The key generation circuit 258 can generate an initial key (IK) for the device 110 based on identification (ID) (e.g., a serial number) of the device 110 and a base key (BK). The BK can be any key from which an IK can be generated. The key generation circuit can also provide the BK and the ID of the device 110 to a host 120 such that the host 120 can generate the IK and the device 110 and the host 120 can initiate communications.

Figure 3:
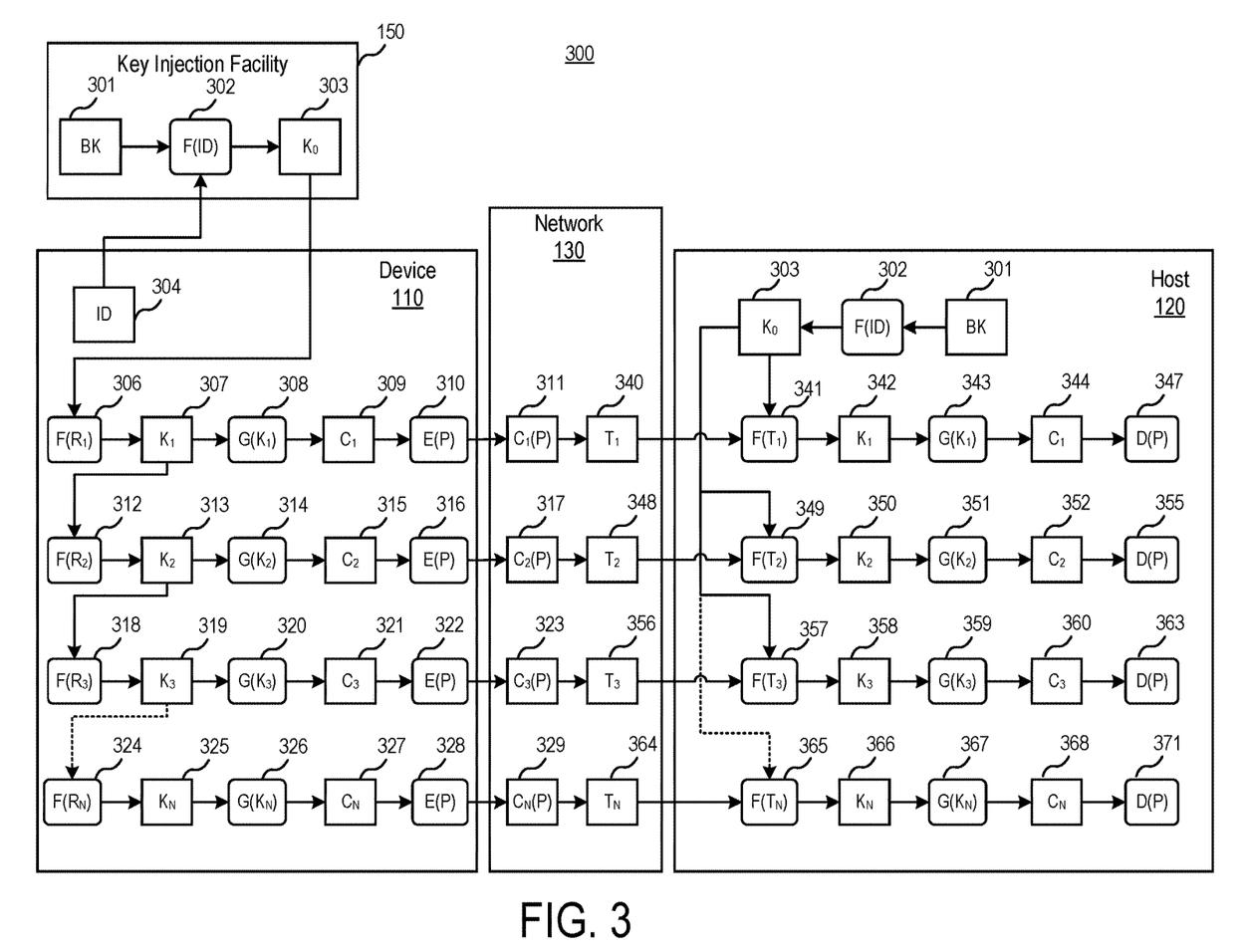
FIG. 3 is a flow diagram illustrating a method for generating cryptographic keys and encrypting and decrypting original data, according to various arrangements.

FIG. 3 is a flow diagram illustrating a method 300 for generating cryptographic keys between the device 110 and the host 120, according to various arrangements. As shown in FIG. 3, boxes with rounded corners denote a process, and boxes with sharp corners denote data or information. Referring to FIGS. 1-3, the method 300 illustrates an example of generating cryptographic keys (e.g., one or more of the keys 307, 313, 319, or 325) and transmitting original data protected by the cryptographic keys, where each of the keys is unique to a transaction involving the original data. One of ordinary skill in the art can appreciate that other arrangements of generating cryptographic keys and transmitting original data protected by the cryptographic keys can be implemented.

In some arrangements, two different functions are used to derive a cryptographic key from the BK and a random number to assure that the cryptographic key is unique to a given transaction involving original data. In some arrangements, the first function (and/or iterations thereof) and the second function are stringed together. The first function (F) is a repetitive one-way function. A one-way function returns a result corresponding to an input in a forward operation. In a reverse operation, it is computationally complex or almost impossible to use the one-way function to derive the input using the result. The first function (F) can be iterated multiple times for synchronizing the derived tokens in the manner described.

In some arrangements, the first function (F) is a modulo function (MOD) of the addition of a random number to a previously generated number. Illustrating with a non-limiting example in the AES-256 space, the first function (F) can add the BK to the ID of the device 110 and take MOD ($2^{256}$) of the resulting number in order to generate a key. Using a MOD function assures that the resulting number is always within the AES-256 space such that it does not become too large and unwieldy.

A second function (G) can be used for forward secrecy and prevents discovery of any intermediary values and the original data by obfuscating the cryptographic key. The second function (G) is different than the first function (F). In some arrangements, the second function is a one-way function. In some arrangements, the second function is a one-way hash function. Illustrating with a non-limiting example, the second function (G) can be a Secure Hash Algorithm 256 (SHA-256) hash function. Illustrating with another non-limiting example, the second function (G) can be a hash-based message authentication code (HMAC) function. The device 110 and the host 120 can securely establish the same symmetric key and use it for the HMAC function. The symmetric key can be updated periodically (e.g., daily, hourly, or the like).

In the examples shown, the first functions (F) 306, 312, 318, 324, 341, 349, 357, and 365 are the same function executed for different transactions and/or by a different one of the device 110 and the host 120. The second functions (G(K)) 308, 314, 320, 326, 343, 351, 359, and 367 are the same function executed for different transactions and/or by a different one of the device 110 and the host 120.

In some arrangements, the first functions (F) 306, 312, 318, 324, 341, 349, 357, and 365 are not all the same functions, and the second functions (G(K)) 308, 314, 320, 326, 343, 351, 359, and 367 are not all the same functions. The method for generating cryptographic keys will be successful as long as the corresponding functions (F) and (G) are identical for the device 110 and the host 120 for a single transaction. For example, the method for generating cryptographic keys will be successful if (F($R_1$)) 306 is identical to (F($T_1$)) 341 and (G($K_1$)) 308 is equivalent to (G($K_1$)) 343. The functions (F) and (G) for subsequent transactions do not need to be identical to the functions (F) and (G) for previous transactions for the method to be successful.

In some arrangements, the key injection facility 150 creates an IK ($K_0$) 303 by first creating a BK 301. In some arrangements, the BK 301 is generated by host 120, and the host 120 provides the BK 301 to the key injection facility 150. BK 301 is a value (e.g., a binary string of zeroes and ones) randomly selected by the key injection facility 150. For example, the BK 301 can be a randomly selected 256-bit string. After selecting the BK 301, the key injection facility 150 inputs the BK 301 to a function (F(ID)) 302 that uses a unique ID 304 (e.g., a unique identification number, a serial number, etc.) of the device 110 as the input to the function (F(ID)) 302. For example, the ID 304 can be a 32-bit random value. The function (F(ID)) 302 can be a MOD function based on AES-256 such that the result of the MOD of the addition of the BK 301 and the ID 304 is within the AES-256 space, represented by:

$$F(ID)=K_0=(BK+ID)\text{MOD } 2^{256} \qquad (1)$$

The key injection facility 150 injects the IK ($K_0$) 303 into the device 110 for further calculations. In some arrangements, the key injection facility 150 provides additional initial keys to other devices with unique identification. Because each of the devices to which the key injection facility 150 provides an initial key has a unique identification, each of the devices is provided with a unique initial key. In some arrangements, the key injection facility 150 further provides the BK 301 and the ID 304 to the host 120 via the network 130 such that the host 120 can derive the IK ($K_0$) 303 for use in further calculations. In some arrangements, the host 120 provides the BK 301 to the key injection facility 150.

A user of the device 110 can initiate transactions. A transaction refers to any message where data need to be protected (e.g., encrypted, MAC, HMAC) using symmetric cryptography between the device 110 and the host 120. Illustrating with a non-limiting example, a transaction includes using a payment card number to purchase goods or services in a given moment in time (e.g., at checkout). Subsequent instances in which the same payment card number is used correspond to subsequent transactions based on the same original data.

As shown, for a first transaction using original data, a key for the original data is generated using the IK ($K_0$) 303 and a random number ($R_1$) as inputs to a function (F($R_1$)) 306. The random number ($R_1$) can be generated in a variety of ways. As a non-limiting example, the random number ($R_1$) can be generated by a random number generator internal to the device 110. As another non-limiting example, the random number ($R_1$) can be generated by a biometric sample entered by the user when the transaction is initiated (e.g., a fingerprint scan, a retina scan, etc.). The random numbers generated by a fingerprint scan, for example, can be generated by reading the orientation of the ridges of the user's finger. Because a user will likely never place a finger on a fingerprint scanner the exact same way, the number generated from the ridges will be random and unpredictable. As yet another non-limiting example, the random number ($R_1$) can be generated by any entropy source (e.g., a solar radiation collector, a quantum molecular measurement device, computing system components, etc.) that can provide random numbers. The random numbers generated by a quantum molecular measurement device, for example, can be generated by the uncertainty of measuring certain quantum states. The random numbers generated by computing system components, for example, can be generated by the physical or logical chaos inherent within the components. To assure the random number ($R_1$) generates enough entropy, the random number ($R_1$) can be run through a one-way hash function. The random number ($R_1$) can be any length to provide for the appropriate level of security. In some arrangements, the random number ($R_1$) is a 32-bit random value. In some arrangements, the random number ($R_1$) can be other values (e.g., a 64-bit random value, a 128-bit random value, a 256-bit random value, etc.).

When the device 110 generates the random number ($R_1$), the device 110 also creates a parameter ($T_1$) 340 based on ($R_1$) such that:

$$T_1=R_1 \qquad (2)$$

The function (F($R_1$)) 306 creates a key ($K_1$) 307 by taking the MOD of the addition of the IK ($K_0$) 303 to the random number ($R_1$), as represented by the following equation:

$$F(R_1)=K_1=(K_0+R_1)\text{MOD } 2^{256} \qquad (3)$$

Accordingly, the key ($K_1$) 307 is also a random number because it is based on a function of at least one other random number (e.g., $R_1$). In some arrangements, after the key ($K_1$) 307 is created, the IK ($K_0$) 303 can be destroyed. As shown in equation (3), the MOD $2^{256}$ was used, however, any other MOD function can be used to implement the arrangements described herein (e.g., MOD 2128, MOD 2512, MOD 21024, etc.).

The key ($K_1$) 307 is used as input to the second function (G($K_1$)) 308 to create a cryptographic key ($C_1$) 309. The cryptographic key ($C_1$) 309 is used to protect the original data sent from the device 110 to the host 120. To further protect the original data during the transmission over the network 130, the device 110 can encrypt the original data using an encryption function (E(P)) 310 and the cryptographic key ($C_1$) 309. The encryption functions (E(P)) 310, 316, 322, and 328 are the same function executed for different transactions. In some arrangements, the original data is encrypted using any suitable encryption function (E(P)) 310, and the encryption function (E(P)) 310 outputs encrypted original data ($C_1$(P)) 311. The device 110 transmits the encrypted original data ($C_1$(P)) 311 and the parameter ($T_1$) 340 associated with the transaction to the host 120 via the network 130.

In some arrangements, the host 120 determines the IK ($K_0$) 303 in a manner substantially equivalent to the manner in which the key injection facility 150 determines the IK ($K_0$) 303 (e.g., the host 120 adds the BK 301 to the function (F(ID)) 302 that uses the unique ID 304 of the device 110 as the input to the function 302). In some arrangements, the key injection facility 150 provides the IK ($K_0$) 303 to the host 120 via the network 130. The function (F($T_1$)) 341 derives a host-derived key ($K_1$) 342 by adding the IK ($K_0$) 303 to the parameter ($T_1$) 340, as represented by the following equation:

$$F(T_1)=K_1=(K_0+T_1) \text{MOD } 2^{256} \qquad (4)$$

The function (F($T_1$)) 341 is the same function as the function (F($R_1$)) 306 such that, provided equivalent inputs, the functions (F($T_1$)) 341 and (F($R_1$)) 306 will provide equivalent results. Accordingly, because the random number ($R_1$) is equivalent to the parameter ($T_1$) 340, the key ($K_1$) 307 is equivalent to the host-derived key ($K_1$) 342.

The host-derived key ($K_1$) 342 is used as input to the second function (G($K_1$)) 343 to create a host-derived cryptographic key ($C_1$) 344. The function (G($K_1$)) 343 is the same function as the function (G($K_1$)) 308 such that, provided equivalent inputs, the functions (G($K_1$)) 343 and 308 will provide equivalent results. Accordingly, because the key ($K_1$) 307 is equivalent to the host-derived key ($K_1$) 342, the host-derived cryptographic key ($C_1$) 344 is equivalent to the cryptographic key ($C_1$) 309.

The encrypted original data ($C_1$(P)) 311 is decrypted using the host-derived cryptographic key ($C_1$) 344 and a suitable decryption function (D(P)) 347. The decryption functions (D(P)) 347, 355, 363, and 371 are the same function executed for different transactions and are configured to decrypt data encrypted using the host-derived cryptographic keys. After decrypting the data using the host-derived cryptographic key ($C_1$) 344 and the decryption function (D(P)) 3, the original data can be read.

As shown, for a second transaction, the key ($K_1$) 307 is used as an input to a function (F($R_2$)) 312. A random number ($R_2$) is also used as an input to the function (F($R_2$)) 312 such that the function (F($R_2$)) 312 creates a key ($K_2$) 313 as shown by the following equation:

$$F(R_2)=K_2=(K_1+R_2) \text{MOD } 2^{256} \qquad (5)$$

The random number ($R_2$) is generated by any of the methods previously described.

Accordingly, the key ($K_2$) 313 is also a random number because it is based on a function of at least one other random number (e.g., $K_1$, $R_2$). In some arrangements, after the key ($K_2$) 313 is created, the key ($K_1$) 307 can be destroyed. When the device 110 generates the random number ($R_2$), the device 110 also creates a parameter ($T_2$) 348 based on ($R_2$) such that:

$$T_2=T_1+R_2 \qquad (6)$$

The key ($K_2$) 313 is used as input to the second function (G($K_2$)) 314 to create a cryptographic key ($C_2$) 315. The cryptographic key ($C_2$) 315 is used to protect the original data sent from the device 110 to the host 120. To further protect the original data during the transmission over the network 130, the device 110 can encrypt the original data using an encryption function (E(P)) 316 and the cryptographic key ($C_2$) 315. In some arrangements, the original data is encrypted using any suitable encryption function (E(P)) 316, and the encryption function (E(P)) 316 outputs encrypted original data ($C_2$(P)) 317. The device 110 transmits the encrypted original data ($C_2$(P)) 317 and the parameter ($T_2$) 348 associated with the transaction to the host 120 via the network 130.

The function (F($T_2$)) 349 derives a host-derived key ($K_2$) 350, as shown in the equation below:

$$F(T_2)=K_2=(K_0+T_2) \text{MOD } 2^{256} \qquad (7)$$

The function (F($T_2$)) 349 is the same function as the function (F($R_2$)) 312 such that, provided equivalent inputs, the functions (F($T_2$)) 349 and (F($R_2$)) 312 will provide equivalent results. Accordingly, because the inputs are equivalent, the key ($K_2$) 313 is equivalent to the host-derived key ($K_2$) 350.

The host-derived key ($K_2$) 350 is used as input to the second function (G($K_2$)) 351 to create a host-derived cryptographic key ($C_2$) 352. The second function (G($K_2$)) 351 is the same function as the second function (G($K_2$)) 314 such that, provided equivalent inputs, the functions (G($K_2$)) 351 and 314 will provide equivalent results. Accordingly, because the key ($K_2$) 313 is equivalent to the host-derived key ($K_2$) 350, the host-derived cryptographic key ($C_2$) 352 is equivalent to the cryptographic key ($C_2$) 315.

The encrypted original data ($C_2$(P)) 317 is decrypted using the host derived cryptographic key ($C_2$) 352 and a suitable decryption function (D(P)) 355. The decryption functions (D(P)) 347, 355, 363, and 371 are the same function executed for different transactions and are configured to decrypt data encrypted using the host-derived cryptographic keys. After decrypting the data using the host-derived cryptographic key ($C_2$) 352 decryption function (D(P)) 355, the original data can be read.

As shown, for a third transaction, the key ($K_2$) 313 is used as an input to a function (F($R_3$)) 318. A random number ($R_3$) is also used as an input to the function (F($R_3$)) 318 such that the function (F($R_3$)) 318 creates a key ($K_3$) 319 as shown by the following equation:

$$F(R_3)=K_3=(K_2+R_3) \text{MOD } 2^{256} \qquad (8)$$

The random number ($R_3$) is generated by any of the methods previously described. Accordingly, the key ($K_3$) 319 is also a random number because it is based on a function of at least one other random number (e.g., $K_2$, $R_3$). In some arrangements, after the key ($K_3$) 319 is created, the key ($K_2$) 313 can be destroyed. When the device 110 generates the random number ($R_3$), the device 110 also creates a parameter ($T_3$) 356 based on ($R_3$) such that:

$$T_3=T_2+R_3 \qquad (9)$$

The key ($K_3$) 319 is used as input to the second function (G($K_3$)) 320 to create a cryptographic key ($C_3$) 321. The cryptographic key ($C_3$) 321 protects the original data sent from the device 110 to the host 120. To further protect cryptographic keys during the transmission over the network 130, the device 110 can encrypt the original data using the encryption function (E(P)) 322 and the cryptographic key ($C_3$) 321. In some arrangements, the original data is encrypted using any suitable encryption function (E(P)) 322, and the encryption function (E(P)) 322 outputs encrypted original data ($C_3$(P)) 323. The device 110 transmits the encrypted original data ($C_3$(P)) 323 and the parameter ($T_3$) 356 associated with the transaction to the host 120 via the network 130.

The function (F($T_3$)) 357 derives a host-derived key ($K_3$) 358, as shown by the equation below:

$$F(T_3)=K_3=(K_0+T_3) \text{MOD } 2^{256} \qquad (10)$$

The function (F(T₃)) 357 is the same function as the function (F(R₃)) 318 such that, provided equivalent inputs, the functions (F(T₃)) 357 and (F(R₃)) 318 will provide equivalent results. Accordingly, because the inputs are equivalent, the key (K₃) 319 is equivalent to the host-derived key (K₃) 358.

The host-derived key (K₃) 358 is used as input to the second function (G(K₃)) 359 to create a host-derived cryptographic key (C₃) 360. The second function (G(K₃)) 359 is the same function as the second function (G(K₃)) 320 such that, provided equivalent inputs, the functions (G(K₃)) 359 and 320 will provide equivalent results. Accordingly, because the key (K₃) 319 is equivalent to the host-derived key (K₃) 358, the host-derived cryptographic key (C₃) 360 is equivalent to the cryptographic key (C₃) 321.

The encrypted original data (C₃(P)) 323 is decrypted using the host derived cryptographic key (C₃) 360 and a suitable decryption function (D(P)) 363. The decryption functions (D(P)) 347, 355, 363, and 371 are the same function executed for different transactions and are configured to decrypt data encrypted using the host-derived cryptographic keys. After decrypting the data using the host-derived cryptographic key (C₃) 360 and the decryption function (D(P)) 363, the original data can be read.

As shown, for the $n^{th}$ transaction, the key $(K_{N-1})$ 325 is used as an input to a function $(F(R_N))$ 324. A random number $(R_N)$ is also used as an input to the function $(F(R_N))$ 324 such that the function $(F(R_N))$ 324 creates a key $(K_N)$ 325 as shown by the following equation:

$$F(R_N)=K_N=(K_{N-1}+R_N) \text{MOD } 2^{256} \qquad (11)$$

The random number $(R_N)$ is generated by any of the methods previously described. Accordingly, the key $(K_N)$ 325 is also a random number because it is based on a function of at least one other random number (e.g., $K_{N-1}$, $R_N$). In some arrangements, after the key $(K_N)$ 325 is created, the key $(K_{N-1})$ can be destroyed. When the device 110 generates the random number $(R_N)$, the device 110 also creates a parameter $(T_N)$ 364 based on $(R_N)$ such that:

$$T_N=T_{N-1}+R_N \qquad (12)$$

The key $(K_N)$ 325 is used as input to the second function $(G(K_N))$ 326 to create a cryptographic key $(C_N)$ 327. The cryptographic key $(C_N)$ 327 is used to protect the original data sent from the device 110 to the host 120. To further protect the original data during the transmission over the network 130, the device 110 can encrypt the original data using an encryption function (E(P)) 328 and the cryptographic key $(C_N)$ 327. In some arrangements, the original data is encrypted using any suitable encryption function (E(P)) 328, and the encryption function (E(P)) 328 outputs an encrypted original data $(C_N(P))$ 329. The device 110 transmits the encrypted original data $(C_N(P))$ 329 and the parameter $(T_N)$ 364 associated with the transaction to the host 120 via the network 130.

The function $(F(T_N))$ 365 derives a host-derived key $(K_N)$ 366 as shown by the equation below:

$$F(T_N)=K_N=(K_0+T_N) \text{MOD } 2^{256} \qquad (13)$$

The function $(F(T_N))$ 365 is the same function as the function $(F(R_N))$ 324 such that, provided equivalent inputs, the functions $(F(T_N))$ 365 and $(F(R_N))$ 324 will provide equivalent results. Accordingly, because the inputs are equivalent, the key $(K_N)$ 325 is equivalent to the host-derived key $(K_N)$ 366.

The host-derived key $(K_N)$ 366 is used as input to the second function $(G(K_N))$ 367 to create a host-derived cryptographic key $(C_N)$ 368. The second function $(G(K_N))$ 367 is the same function as the second function $(G(K_N))$ 326 such that, provided equivalent inputs, the functions $(G(K_N))$ 367 and 326 will provide equivalent results. Accordingly, because the key $(K_N)$ 325 is equivalent to the host-derived key $(K_N)$ 366, the host-derived cryptographic key $(C_N)$ 368 is equivalent to the cryptographic key $(C_N)$ 327.

The encrypted original data $(C_N(P))$ 329 is decrypted using the host derived cryptographic key $(C_N)$ 368 and a suitable decryption function (D(P)) 371. The decryption functions (D(P)) 347, 355, 363, and 371 are the same function executed for different transactions and are configured to decrypt data encrypted using the host-derived cryptographic keys. After decrypting the data using the host-derived cryptographic key (C₂) 352 and the decryption function (D(P)) 371, the original data can be read.

Figure 4:
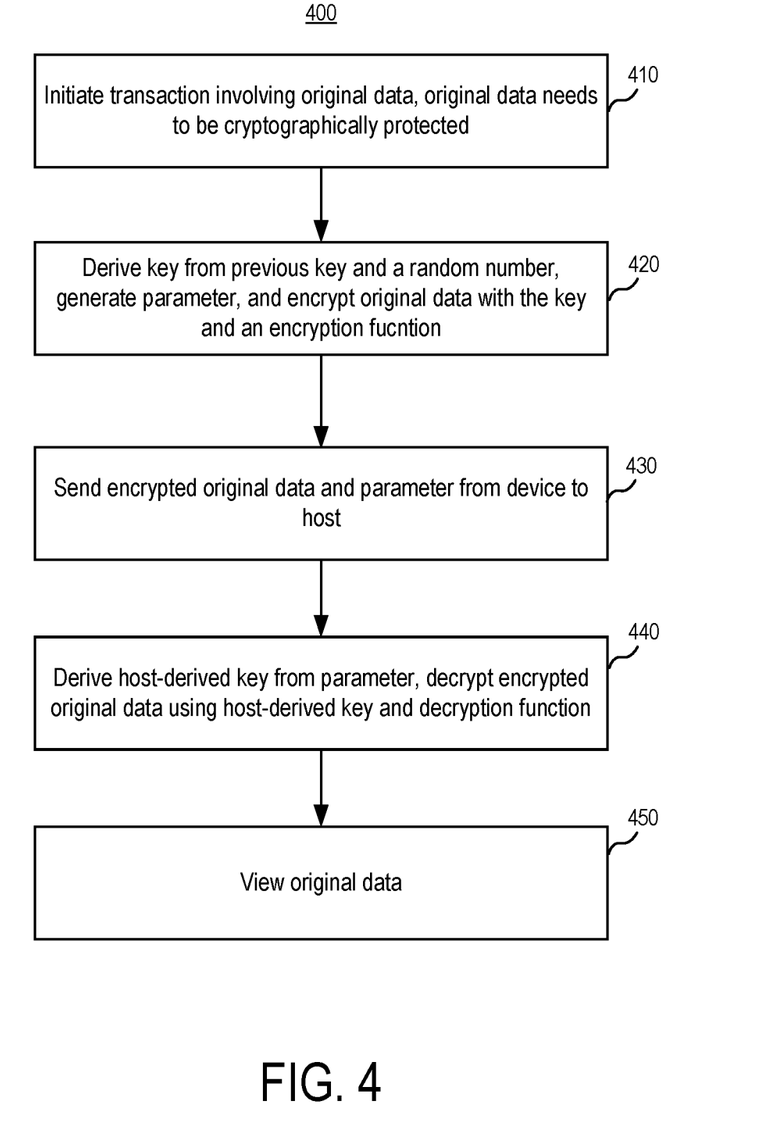
FIG. 4 is a flow diagram illustrating a method for generating cryptographic keys and encrypting and decrypting original data, according to various arrangements.

FIG. 4 is a flow diagram illustrating a method 400 for generating cryptographic keys and encrypting and decrypting original data, according to various arrangements. Referring to FIGS. 1-4, the method 400 is executed by the device 110 in some arrangements. Each of blocks 410-450 corresponds to one or more of the blocks 301-371.

At 410, the device 110 initiates a transaction involving original data that needs to be cryptographically protected by a key. In some arrangements, the key can be generated using an IK 303 and a random number. In other arrangements, the key can be generated using the previous key and a random number. Illustrating with a non-limiting example, the transaction may be the second transaction involving original data.

At 420, the device 110 derives a key (e.g., the cryptographic key (C₂) 315) from the previous key (K₁) 307 and a random number (R₂). The cryptographic key (C₂) 315 is unique to the transaction. The device 110 also generates a parameter (e.g., the parameter (T₂) 348) based on the random number (R₂).

In some arrangements, the client device runs a first function (e.g., the first function (F(R₂)) 312 with a previous key (K₁) 307 and a random number (R₂) as inputs to derive the key (K₂) 313. In some arrangements, upon the key (K₂) 313 being derived, the previous key (K₁) 307 can be deleted, such that only the most current key is stored on the device 110. In some arrangements, the device 110 runs a second function (e.g., the second function (G(K₂)) 314) with the key (K₂) as input to determine the cryptographic key (C₂) 315. In some arrangements, the cryptographic key (C₂) 315 and the encryption function (E(P)) 316 are used to encrypt the original data and create the encrypted original data C₂(P) 317.

At 430, the client device sends the encrypted original data (C₂(P)) 317 to the host 120. In some arrangements, the device 110 sends the parameter (T₂) 348 to the host 120 with the encrypted key (C₂(P)) 317.

At 440, the host 120 derives a host-derived key (e.g., the host-derived key cryptographic key (C₂) 352) from the IK (K₀) 303 and the parameter (T₂) 348. The host-derived cryptographic key (C₂) 352 is unique to the transaction.

In some arrangements, the host 120 executes a first function (e.g., the first function (F(T₂)) 349) with the IK (K₀) 303 and the parameter (T₂) 348 as inputs to derive the host-derived key (K₂) 350. In some arrangements, upon the host-derived key (K₂) 350 being derived, the previous host-derived key (K₁) 342 can be deleted, such that only the most current key is stored on the host 120. In some arrangements, the host 120 executes a second function (e.g., the second function (G(K₂)) 351 with the key (K₂) 350 as input to determine the host-derived cryptographic key (C₂) 352. In some arrangements, the host-derived cryptographic key (C₂)

352 and the decryption function (D(P)) 355 are used to decrypt the encrypted original data ($C_2$(P)) 317. At 450, the original data can be viewed.

The method 400 can be repeated for a subsequent transaction (e.g., the $N^{th}$ transaction). For example, the device 110 can initiate another transaction involving the original data. The device 110 derives a key (e.g., the crytographic key ($C_N$) 327) from the previous key ($K_{N-1}$) and a random number ($R_N$) in the manner described. The cryptographic key ($C_N$) 327 is unique to the transaction.

The device 110 sends the encrypted original data ($C_N$(P)) 329 to the host 120. In some arrangements, the device 110 sends the encrypted original data ($C_N$(P)) 329 to the host 120 along with a random number ($R_N$). The host 120 derives the host derived cryptographic key ($C_N$) 368 in the manner described. The host 120 decrypts the encrypted original data ($C_N$(P)) 329 with the decryption function (D(P)) 371 and the host derived cryptographic key ($C_N$(P)) 329 in the manner described. The original data can then be viewed.

Figure 5:
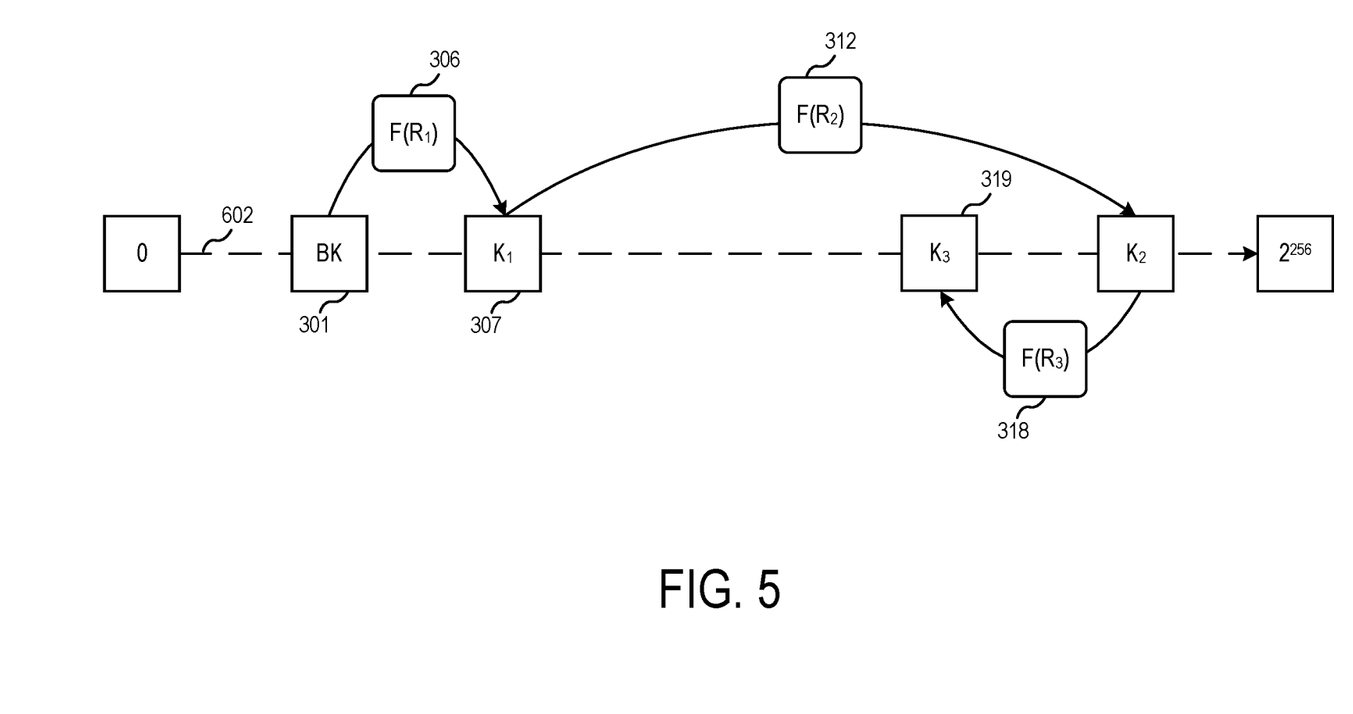
FIG. 5 is a block diagram of an example of the cryptographic key generation process set forth in FIG. 3.

FIG. 5 is a block diagram of an example of the key generation process set forth in FIG. 3. As described, the example key generation process occurs in the AES 256-bit space. However, the key generation process can occur in any other encryption space (e.g., AES 128-bit space, AES 1024-bit space, etc.). The AES 256-bit space is represented by the continuum 602 that extends from zero (e.g., the lowest value in the 256-bit space) to $2^{256}$ (e.g., the highest value in the 256-bit space).

As described, the BK 301 is included as input to the function (F($R_1$)) 306 such that the key ($K_1$) 307 is created, as shown in equation (2). In this example, because the value of $K_0+R_1$ is less than $2^{256}$, the output of the function (F($R_1$)) 306 is equal to $K_0+R_1$ (e.g., the MOD portion of the function (F($R_1$)) 306 is not executed). Thus, the key ($K_1$) 306 is located on the continuum 602 with a value higher than that of the BK 301.

The key ($K_1$) is used as input to the function (F($R_2$)) 312 such that the key ($K_2$) 313 is created, as shown in equation (5). In this example, because the value of $K_1+R_2$ is less than $2^{256}$ the output of the function (F($R_2$)) 312 is equal to $K_1+R_2$ (e.g., the MOD portion of the function (F($R_2$)) 312 is not executed). Thus, the key ($K_2$) 313 is located on the continuum 602 with a value higher than that of the key ($K_1$) 306.

The key ($K_2$) 313 is used as input to the function (F($R_3$)) 318 such that the key ($K_3$) 319 is created, as shown in equation (8). In this example, because the value of $K_2+R_3$ is greater than $2^{256}$, the MOD portion of the function (F($R_3$)) 318 is executed to assure the value of the key ($K_3$) 319 remains on the continuum 602. Thus, the key ($K_3$) 319 is located on the continuum 602 with a value lower than that of the key ($K_2$) 313.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for using symmetric cryptographic keys between a device and a host, comprising:
   identifying, by the device, a transaction involving first data to be protected;
   deriving, by the device, a first cryptographic key for the first data based on a first random number and a previous generated key used to validate a previous transaction;
   protecting, by the device, the first data with the first cryptographic key;
   generating, by the device, a first parameter for decrypting the protected first data, the first parameter generated based on the first random number and a previously generated parameter for decrypting data associated with the previous transaction, the first parameter generated such that the host is to decrypt the protected first data using the first parameter and an initial key different from the first cryptographic key;
   sending, by the device to the host, the protected first data and the first parameter generated based on the first random number;
   deriving, by the device, a second cryptographic key for second data of a second transaction based on the first cryptographic key and a second random number different from the first random number;
   protecting, by the device, the second data with the second cryptographic key; and
   sending, by the device to the host, the protected second data and a second parameter generated based on the second random number and the first parameter.

2. The method of claim 1, wherein the first data comprises one or more of a payment card number, a financial account number, a password, a social security number, a name, an address, an email address, any Personally Identifiable Information (PII), a security object, and a seed for key-generation.

3. The method of claim 1, wherein deriving the first cryptographic key comprises:
   running a first function with the previous generated key as input to determine a first key; and
   running a second function with the first key as input to determine the first cryptographic key.

4. The method of claim 3, wherein the first random number is randomly generated based on a random number generator using various entropy methods, comprising:
   physical or logical chaos of computing system components;

unpredictability of capturing biometric sample data; and
uncertainty of measuring quantum states.

5. The method of claim 3, wherein the previous generated key is deleted after the first cryptographic key is generated.

6. The method of claim 3, further comprising generating, by the device, the second parameter based on the second random number.

7. The method of claim 6, wherein the second random number is randomly generated based on a random number generator, comprising:
physical or logical chaos of computing system components;
unpredictability of capturing biometric sample data; and
uncertainty of measuring quantum states.

8. The method of claim 3, wherein deriving the second cryptographic key comprises:
running the first function with the first cryptographic key and the second random number as input to determine a second key; and
running the second function with the second key as input to determine the second cryptographic key.

9. The method of claim 8, wherein the first cryptographic key is deleted after the second key is generated.

10. A system for using symmetric cryptographic keys with a host, comprising:
a device comprising one or more processors coupled to memory, the one or more processors configured to:
identify a transaction involving first data to be protected;
derive a first cryptographic key for the first data based on a first random number and a previous generated key used to validate a previous transaction;
protect the first data with the first cryptographic key;
generate a first parameter for decrypting the protected first data, the first parameter generated based on the first random number and a previously generated parameter for decrypting data associated with the previous transaction, the first parameter generated such that the host is to decrypt the protected first data using the first parameter and an initial key different from the first cryptographic key;
send, to the host, the protected first data and the first parameter generated based on the first random number;
derive a second cryptographic key for second data of a second transaction based on the first cryptographic key and a second random number different from the first random number;
protect the second data with the second cryptographic key; and
send, to the host, the protected second data and a second parameter generated based on the second random number and the first parameter.

11. The system of claim 10, wherein the first data comprises one or more of a payment card number, a financial account number, a password, a social security number, a name, an address, an email address, any Personally Identifiable Information (PII), a security object, and a seed for key-generation.

12. The system of claim 10, wherein to derive the first cryptographic key, the one or more processors are further configured to:
run a first function with the previous generated key as input to determine a first key; and
run a second function with the first key as input to determine the first cryptographic key.

13. The system of claim 12, wherein the first random number is randomly generated based on a random number generator using various entropy systems, comprising:
physical or logical chaos of computing system components;
unpredictability of capturing biometric sample data; and
uncertainty of measuring quantum states.

14. The system of claim 12, wherein the previous generated key is deleted after the first cryptographic key is generated.

15. The system of claim 12, wherein the one or more processors are further configured to generate the second parameter based on the second random number.

16. The system of claim 15, wherein the second random number is randomly generated based on a random number generator, comprising:
physical or logical chaos of computing system components;
unpredictability of capturing biometric sample data; and
uncertainty of measuring quantum states.

17. The system of claim 12, wherein the one or more processors are further configured to:
run the first function with the first cryptographic key and the second random number as input to determine a second key; and
run the second function with the second key as input to determine the second cryptographic key.

18. The system of claim 17, wherein the first cryptographic key is deleted after the second key is generated.

19. A non-transitory computer-readable storage device comprising instructions that, when executed by one or more processors of a device, cause the one or more processors to perform operations, comprising:
identifying a transaction involving first data to be protected;
deriving a first cryptographic key for the first data based on a first random number and a previous generated key used to validate a previous transaction;
protecting the first data with the first cryptographic key;
generating, a first parameter for decrypting the protected first data, the first parameter generated based on the first random number and a previously generated parameter for decrypting data associated with the previous transaction, the first parameter generated such that a host is to decrypt the protected first data using the first parameter and an initial key different from the first cryptographic key;
sending, to the host, the protected first data and the first parameter generated based on the first random number;
deriving a second cryptographic key for second data of a second transaction based on the first cryptographic key and a second random number different from the first random number;
protecting the second data with the second cryptographic key; and
sending, to the host, the protected second data and a second parameter generated based on the second random number and the first parameter.

20. The non-transitory computer-readable storage device of claim 19, wherein the operations further comprise:
running a first function with the previous generated key as input to determine a first key; and
running a second function with the first key as input to determine the first cryptographic key.

* * * * *